United States Patent
Aoki et al.

(10) Patent No.: US 6,452,993 B1
(45) Date of Patent: Sep. 17, 2002

(54) METHOD OF CARRYING OUT LARGE-SIZED APPARATUS

(75) Inventors: Masataka Aoki, Hitachi (JP); Norihito Saitou, Hitachiota (JP); Takahiro Adachi, Hitachi (JP)

(73) Assignees: Hitachi, Ltd., Tokyo (JP); HESCO Technology Co., Ltd., Ibaraki (JP); ICC Co., Ltd., Ibaraki (JP)

( * ) Notice: Subject to any disclaimer, the term of this patent is extended or adjusted under 35 U.S.C. 154(b) by 0 days.

(21) Appl. No.: 09/482,027

(22) Filed: Jan. 13, 2000

(30) Foreign Application Priority Data

Jan. 14, 1999 (JP) ............................................. 11-007309

(51) Int. Cl.$^7$ ............................................... G21C 19/02
(52) U.S. Cl. ...................... 376/260; 376/262; 376/268; 376/272; 376/287; 376/463
(58) Field of Search ................................ 376/260, 463, 376/268, 272, 262, 287

(56) References Cited

U.S. PATENT DOCUMENTS

| | | | | |
|---|---|---|---|---|
| 3,194,741 A | * | 7/1965 | Long et al. ..................... | 176/30 |
| 3,917,953 A | * | 11/1975 | Wodrich | |
| 4,090,087 A | * | 5/1978 | Weissenfluh | |
| 4,259,153 A | * | 5/1981 | Pryamilov et al. ............. | 176/30 |
| 4,280,873 A | * | 7/1981 | Hahn | |
| 4,299,658 A | * | 11/1981 | Meuschke et al. | |
| 4,450,134 A | * | 5/1984 | Soot et al. | |
| 4,493,792 A | * | 1/1985 | Graf, Jr. | |
| 4,594,774 A | * | 6/1986 | Barker et al. | |
| 4,644,171 A | * | 2/1987 | Mollon ..................... | 250/518.1 |
| 4,755,347 A | * | 7/1988 | Tolmie ....................... | 376/272 |
| 5,225,150 A | * | 7/1993 | Malandra et al. | |
| 5,525,408 A | * | 6/1996 | Weir et al. ................... | 428/220 |
| 5,574,759 A | * | 11/1996 | Dietrich et al. ............. | 376/260 |

FOREIGN PATENT DOCUMENTS

| | | | | |
|---|---|---|---|---|
| JP | 62-285100 | | 12/1987 | ........... G21C/13/00 |
| JP | 6-230188 | | 8/1994 | |
| JP | 8-62368 | | 3/1996 | |
| JP | 9-145882 | * | 6/1997 | ........... G21C/13/00 |
| JP | 10-39076 | | 2/1998 | ........... G21C/13/00 |
| JP | 11-311693 | * | 11/1999 | |

* cited by examiner

*Primary Examiner*—Michael J. Carone
*Assistant Examiner*—John Richardson
(74) *Attorney, Agent, or Firm*—Mattingly, Stanger & Malur, P.C.

(57) ABSTRACT

When a radioactivated reactor pressure vessel is carried out from a nuclear reactor building of a nuclear power plant, a first opening portion for carrying out the reactor pressure vessel is provided in a roof of the nuclear reactor building, a radiation shield for covering the reactor pressure vessel and shielding radiations is carried into the reactor building through the first opening portion, and installed on a reactor shield wall, lowering a hanger through the first opening portion and a slit provided on an upper lid of the radiation shield, a part of a lid of the reactor pressure vessel and a part of the upper lid of the radiation shield are abutted by hanging up the reactor pressure vessel by the hanger, and the reactor pressure vessel and the radiation shield integrated therewith are raised and carried out of the reactor building, whereby the shield can be easily mounted on the large-sized apparatus in a short time and a dose of radiations exposed to a worker when the shield is mounted can be reduced.

6 Claims, 12 Drawing Sheets

METHOD OF CARRYING OUT LARGE-SIZED APPARATUS

BACKGROUND OF THE INVENTION

The present invention relates to a method of carrying out a radioactivated large-sized apparatus out of a reactor building of a nuclear power plant and, more particularly, to a method suitable for carrying out a reactor pressure vessel.

A first prior art relating to carrying out a reactor pressure vessel is disclosed in JP A 6-230188 which discloses a method in which a reactor pressure vessel is hung up inside an air lock provided on a roof of a reactor building and fixed to the air lock by a fixing tool, and the air lock and the reactor pressure vessel integrated therewith are moved under the condition that the inside of the air lock is kept vacuum.

A second prior art relating to carrying out a reactor pressure vessel is disclosed in JP A 8-62368 which discloses a method in which a clean room adjacent to a reactor building and covering an opening portion of its roof is provided, in-reactor structures, a control rod driving mechanism housing and a reactor pressure vessel are integrated and moved inside the clean room to be carried out. The JP A 8-62368 also discloses a method in which the in-reactor structures, a control rod drive housing, a reactor pressure vessel and a γ shield are integrated and moved inside the clean room and carried out.

A third prior art relating to carrying out of a reactor pressure vessel is disclosed in JP A 9-145882 which discloses a method in which while hanging up a large-sized block as which in-reactor structures and a control rod drive housing are integrated, a cylindrical shield is mounted on its outer surface, and the large-sized block is sealed with this shield and carried out of a reactor building.

The reactor pressure vessels to which the above-mentioned prior arts are applied are large-sized apparatus each reaching the height of about 25 m, diameter of about 6 m and weight of about 1,000 tons, for example. Further, the γ shield, that is, a reactor shield wall, which is a radiation shield for a reactor pressure vessel, is a large-sized apparatus reaching the weight of about 400 tons.

In the first prior art, the air lock is large-sized equipment and it is necessary to keep vacuum inside the large-sized air lock. Therefore, works for carrying out the reactor pressure vessel, including the equipment of air lock and management of vacuum are complicated and need a long time.

In the second prior art, it is necessary to provide the clean room which is larger in scale than the air lock of the first prior art. Therefore, works for carrying out the reactor pressure vessel including the clean room are complicated and need a longer time.

As for the third prior art, a concrete shield mounting method is not disclosed. Further, there is the possibility that a dose of radiations exposed to a worker when the shield is mounted on the reactor pressure vessel increases.

SUMMARY OF THE INVENTION

An object of the present invention is to provide a method of carrying out large-sized apparatus, in which when radioactivated large-sized apparatus is carried out of a reactor building, a shield can be easily mounted on the large-sized apparatus in a short time and an exposure dose to a worker or operator when the shield is mounted can be reduced.

A first invention resides in a large-sized apparatus carrying out method of carrying out a radioactivated large-sized apparatus from a reactor building of a nuclear power plant, which method comprises: providing a first opening portion for carrying out the large-sized apparatus in a region, positioned at an upper portion of the large-sized apparatus, of a roof of the reactor building; carrying a radiation shield for covering the large-sized apparatus and shielding radiations into the reactor building through the first opening portion, and installing the radiation shield on an upper side of the large-sized apparatus; lowering a hanger for hanging up the large-sized apparatus through the first opening portion and a second opening portion provided on an upper end portion of the radiation shield; abutting a part of the upper end portion of the large-sized apparatus and a part of the upper portion of the radiation shield by raising the large-sized apparatus by the hanger; and hanging up and carrying the large-sized apparatus and the radiation shield integrated therewith out of the reactor building.

A second invention resides in a large-sized apparatus carrying out method of carrying out of a radioactivated reactor pressure vessel from a reactor building of a nuclear power plant, which method comprises: providing a first opening portion for carrying out the reactor pressure vessel in a region, positioned at an upper portion of the reactor pressure vessel, of a roof of the reactor building; carrying a radiation shield for covering the reactor pressure vessel and shielding radiations-into the reactor building through the first opening portion, and installing the radiation shield on an upper side of the reactor pressure vessel; lowering a hanger for hanging up the reactor pressure vessel through the first opening portion and a second opening portion provided on an upper end portion of the radiation shield; abutting a part of the upper end portion of the reactor pressure vessel and a part of the upper portion of the radiation shield by raising the reactor pressure vessel by the hanger; and hanging up and carrying the reactor pressure vessel and the radiation shield integrated therewith out of the reactor building.

A third invention resided in a large-sized apparatus carrying out method as set forth in the second invention, wherein the reactor pressure vessel and the radiation shield are integrated and carried out of the reactor building under the condition that incidental apparatus are mounted on the reactor pressure vessel.

A fourth invention resides in a large-sized apparatus carrying out method as set forth in the second invention, wherein the reactor pressure vessel and the radiation shield are integrated and carried out of the reactor building under the condition that the reactor pressure vessel is covered with the radiation shield as far as the vicinity of an upper end portion of a skirt of the reactor pressure vessel.

A fifth invention resides in a large-sized apparatus carrying out method as set forth in the second invention, wherein the reactor pressure vessel and the radiation shield are integrated and carried out of the reactor building under the condition that reactor water is contained in the reactor pressure vessel.

A sixth invention resides in a large-sized apparatus carrying out method as set forth in the second invention, wherein the radiation shield is provided with a stopper at the upper end portion thereof, a part of a lid of the reactor pressure vessel and the stopper are abutted, and the reactor pressure vessel and the radiation shield are integrated and hung up.

A seventh invention resides in a large-sized apparatus carrying out method as set forth in the second invention, wherein the radiation shield is constructed so that a plurality of cylindrical shields covering the reactor pressure vessel are made in multi-layers.

An eighth invention resides in a large-sized apparatus carrying out method of carrying out of a radioactivated cylindrical reactor pressure vessel from a reactor building of a nuclear power plant, which method comprises: providing a first opening portion for carrying out the reactor pressure vessel in a region, positioned over the reactor pressure vessel, of a roof of the reactor building; carrying a cylindrical radiation shield for covering the reactor pressure vessel and shielding radiations into the reactor building through the first, opening portion, and installing the cylindrical radiation shield on a reactor shield wall; lowering a hanger for hanging up the reactor pressure vessel through the first opening portion and a second opening portion provided on an upper lid of the radiation shield; abutting a part of a lid of the reactor pressure vessel and a part of the upper lid of the radiation shield by raising the reactor pressure vessel by the hanger; and hanging up and carrying the reactor pressure vessel and the radiation shield integrated therewith out of the reactor building.

BRIEF DESCRIPTION OF THE INVENTION

Figure 1:
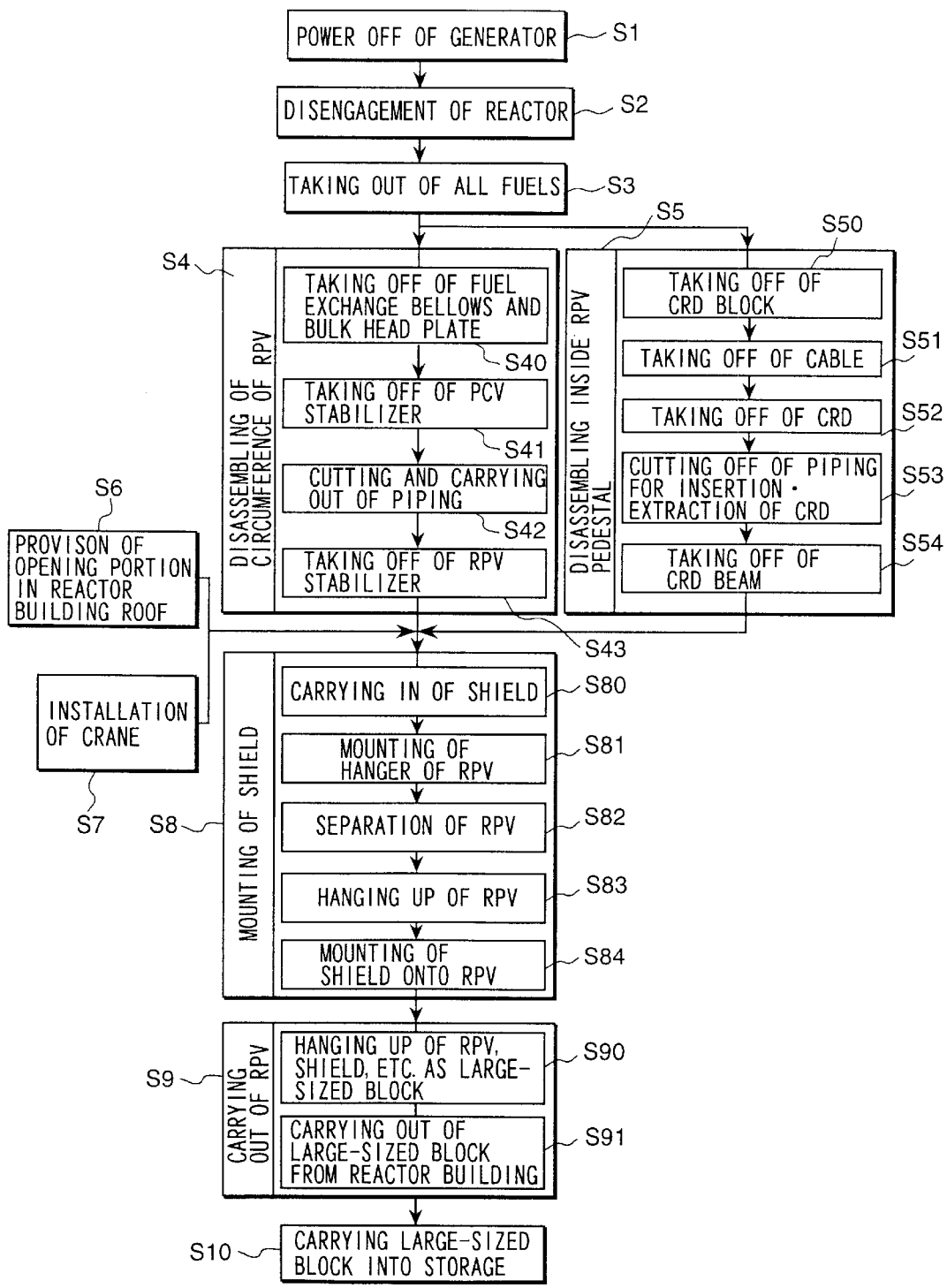
FIG. 1 is a flow chart of a first embodiment that the present invention is applied to a carrying out method of a reactor pressure vessel of a boiling water reactor (BWR)
Figure 11:
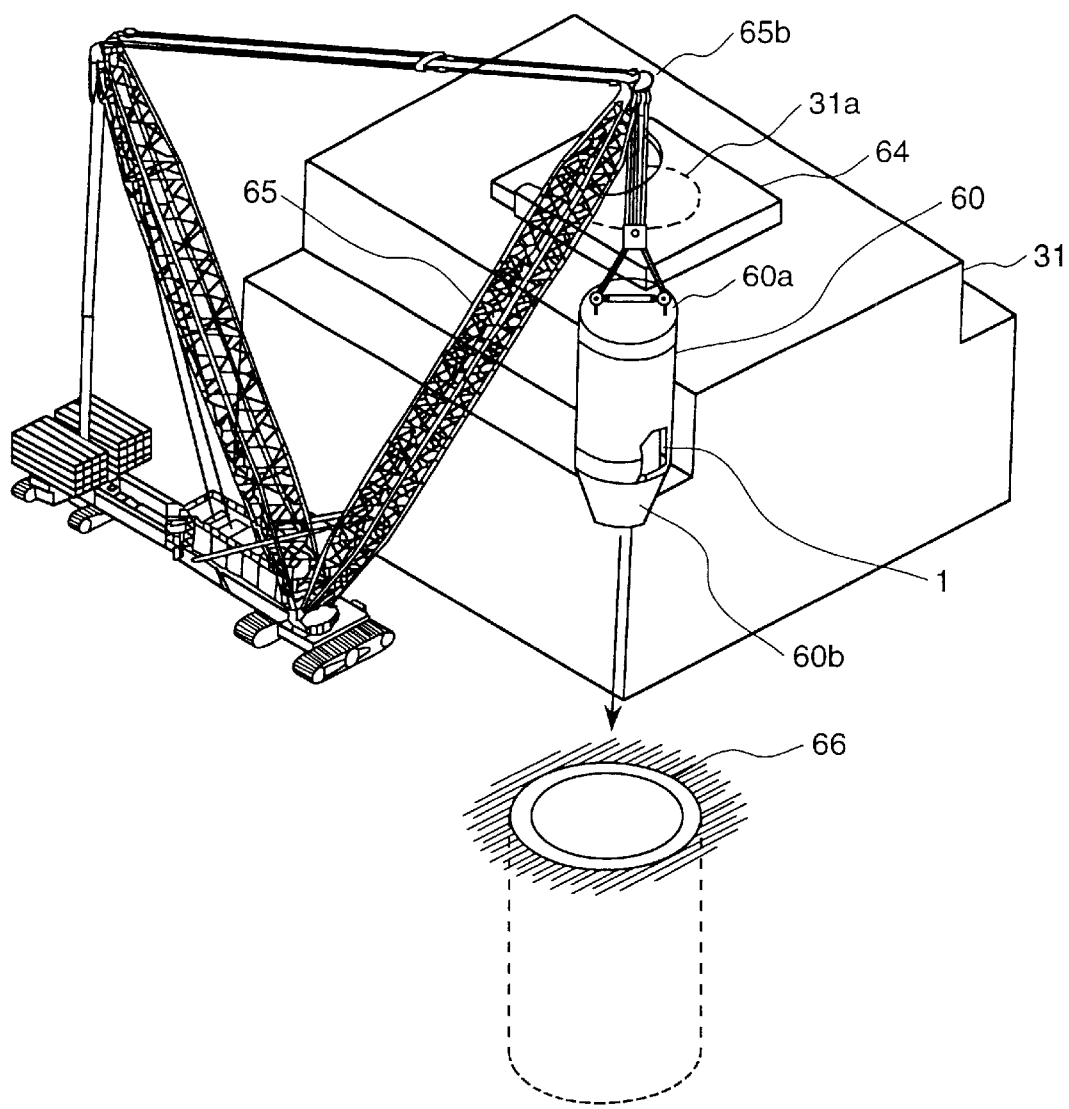
Figure 12A:
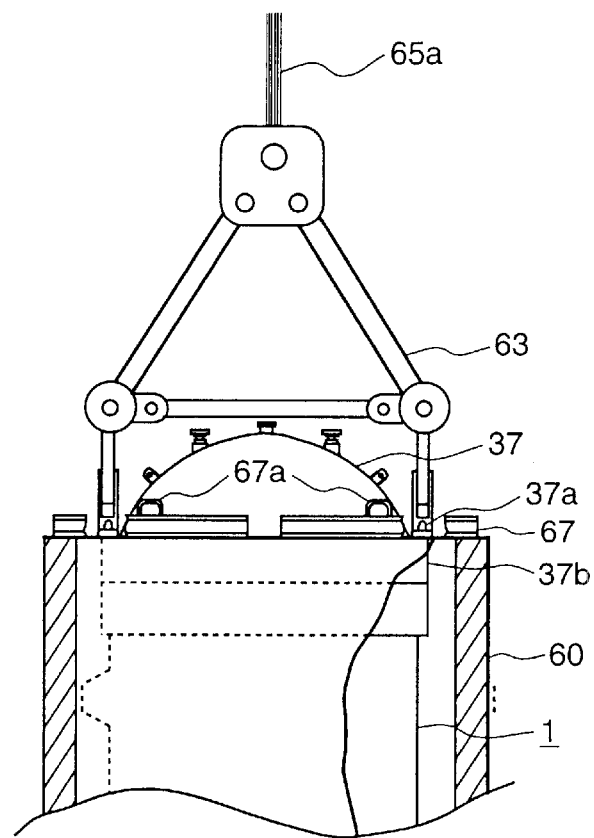
Figure 12B:
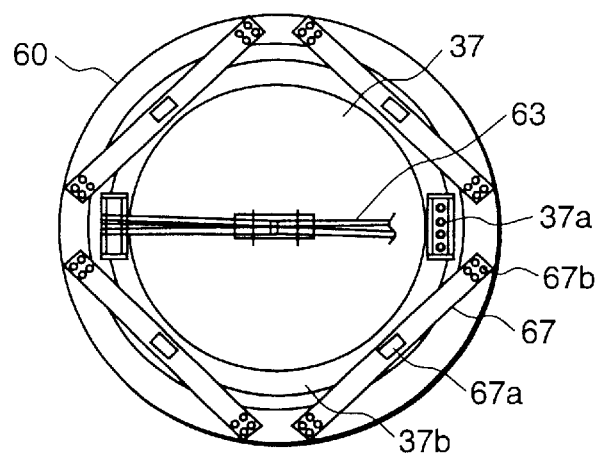

FIG. 11 is a view showing the condition immediately before the large-sized block is carried in a storage, at a step S10 in FIG. 1; and FIG. 12a and FIG. 12b are views showing the condition that the reactor pressure vessel is hung up and a shield of a second embodiment of the present invention is mounted, FIG. 12a is a side view cut off in part showing details of a portion mounting the shield and FIG. 12b is an upper plan view of FIG. 12a.

DESCRIPTION OF EMBODIMENTS OF THE PRESENT INVENTION

A first embodiment that the present invention is applied to a carrying out method of a nuclear reactor pressure vessel (RPV) of a boiling water reactor (BWR) will be explained hereunder. In the present embodiment, an explanation is made about a case where the reactor pressure vessel is exchanged without exchanging a reactor shield wall (RSW).

Figure 2:
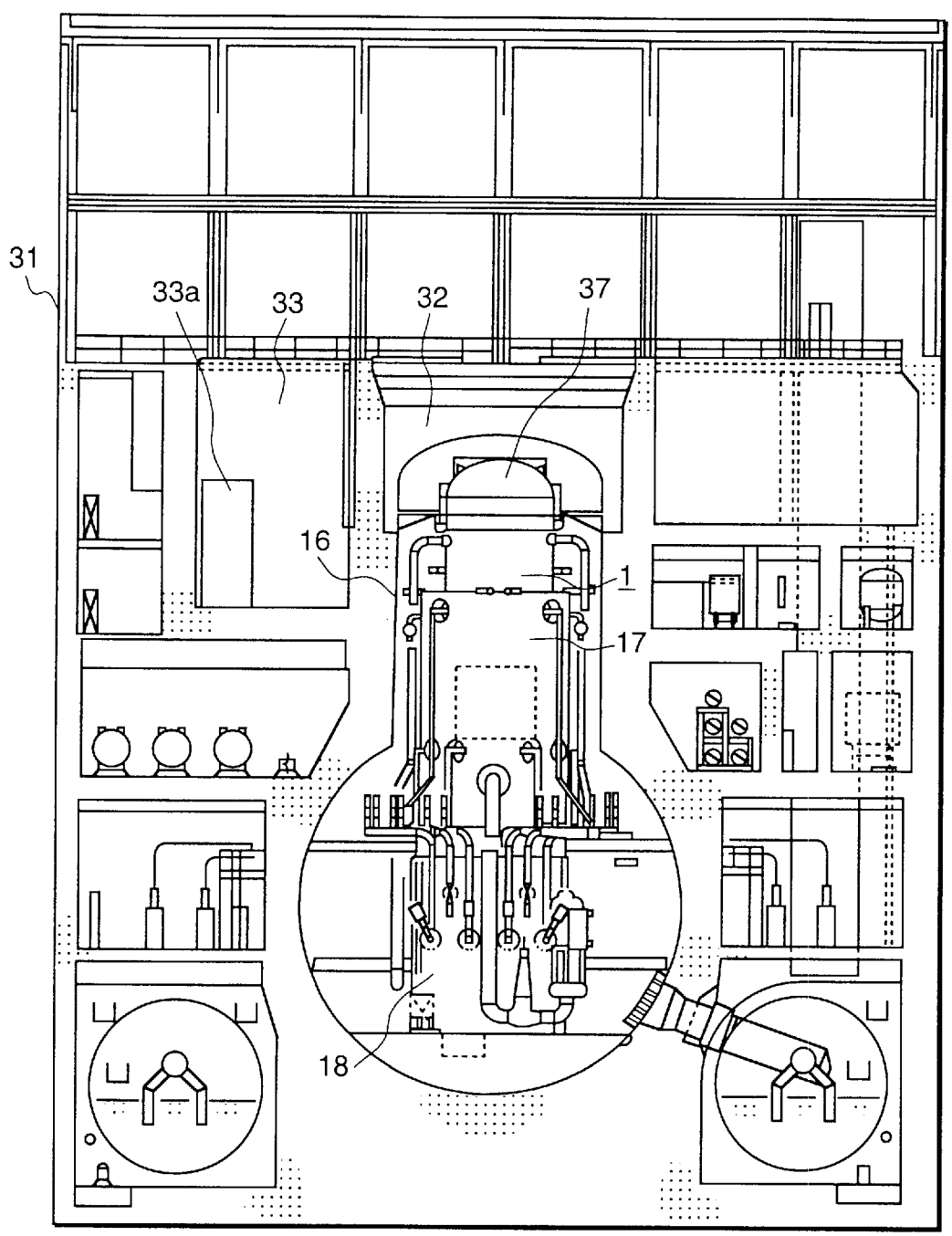
FIG. 2 is a rough vertical sectional view of a reactor building for which the carrying out method of FIG. 1 is applied.

FIG. 1 is a flow chart showing the carrying out method of the reactor pressure vessel of the first embodiment. FIG. 2 is a rough vertical sectional view of a nuclear reactor building applying the carrying out method in FIG. 1, FIG. 3 is a detailed vertical sectional view of a nuclear reactor primary containment vessel (PCV) in FIG. 2, and FIG. 4 is a detailed vertical sectional view of the reactor pressure vessel in FIG. 2.

As shown in FIG. 2, a nuclear reactor primary containment vessel (PCV) 16 containing therein a reactor pressure vessel (RPV) 1, a spent fuel pool 33 storing spent fuels, etc, are provided in a nuclear reactor building 31. At the upper side of the primary containment vessel 16, a reactor well 32 for containing water when fuels are exchanged and when in-reactor structures (RPV 1 inside structures) are taken out is provided. Fuel racks 33a storing the spent fuels are provided inside the spent fuel pool 33. The reactor pressure vessel 1 is provided on a reactor pressure vessel pedestal 18 which is its base, a reactor shield wall (RSW) 17 shielding radiations from the reactor pressure vessel 1 is provided outside the reactor pressure vessel 1.

Figure 3:
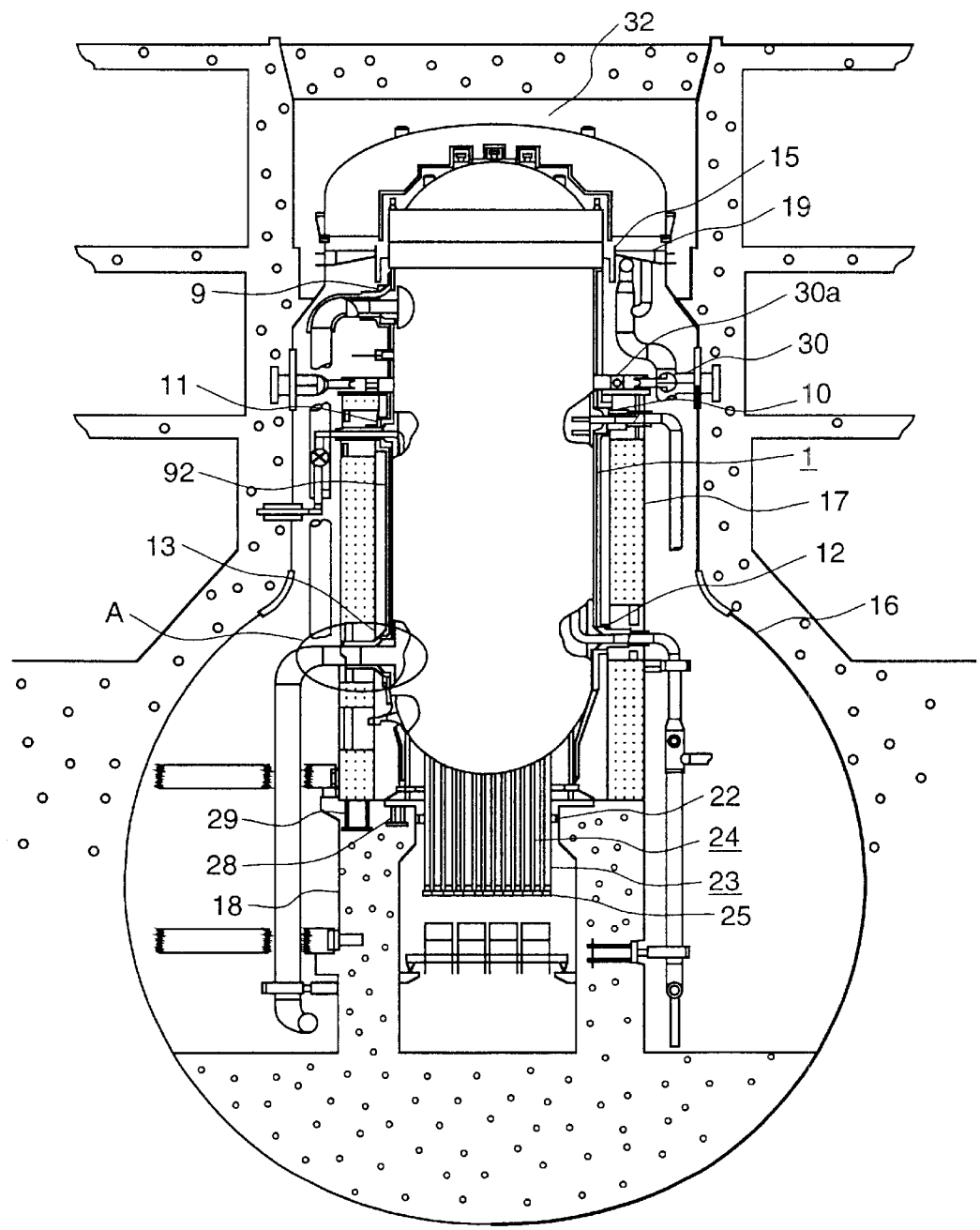
FIG. 3 is a detailed vertical sectional view of a nuclear reactor primary containment vessel (PCV) in FIG. 2.

As shown in FIG. 3, various kinds of nozzles 9–13 are provided on a side wall of the reactor pressure vessel 1, and a heat insulator 92 is provided on the outer periphery of the reactor pressure vessel 1. The reactor pressure vessel 1 is fixed to a reactor pressure vessel pedestal 18 by anchor bolts 28. A fuel exchange bellows 15 and a bulk head plate 19 partitioning the inside of the primary containment vessel 16 are provided on an upper portion of the primary containment vessel 16. A control rod drive housing (CRD housing) 23, a control rod drive housing support beam (CRD beam) 22 supporting the control rod drive housing 23, a control rod drive housing support block (CRD support block) 25, an in-core neutron flux monitor housing (ICM housing) 24, etc, are provided inside the reactor pressure vessel pedestal 18. The reactor shield wall 17 is fixed to the reactor pressure vessel pedestal 18 by anchor bolts 29. A primary containment vessel stabilizer (PCV stabilizer) 30 which is an earthquake resistance support of the primary containment vessel 16 and a reactor pressure vessel stabilizer (RPV stabilizer) 30a which is an earthquake resistance support of the reactor pressure vessel 1 are provided on the upper side of the reactor shield wall 17.

Figure 4:
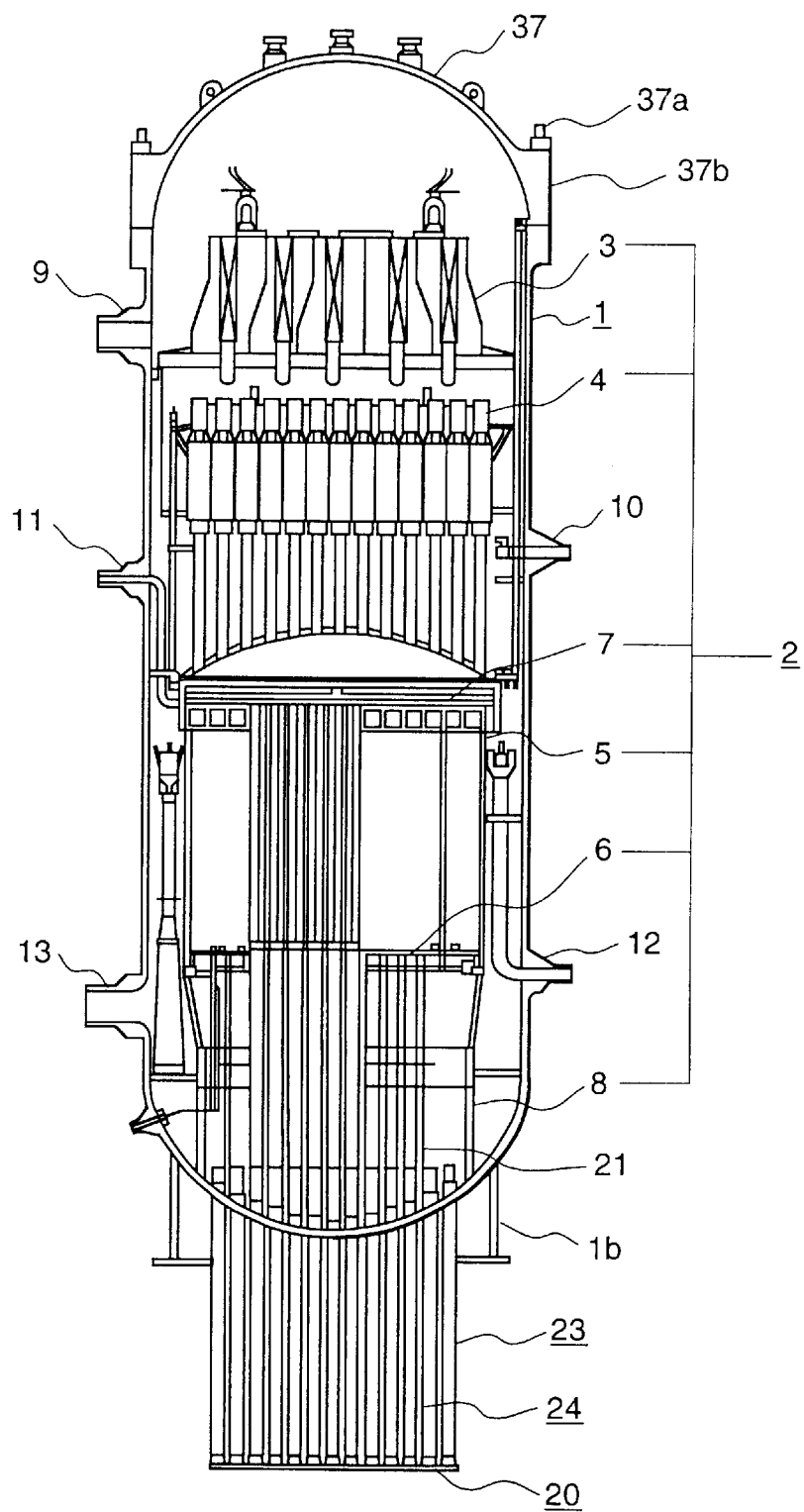
FIG. 4 is a detailed vertical sectional view of a reactor pressure vessel in FIG. 2.

As shown in FIG. 4, the reactor pressure vessel 1 is provided with various in and out-reactor incidental apparatus. The in and out-reactor incidental apparatus are composed of in-reactor structures (core internals) installed inside the reactor pressure vessel 1 and structures other than the in-reactor structures. The in-reactor structures 2 comprise a steam drier 3, a shroud head (including a steam separator) 4, a core shroud 5, a core support plate 6, an upper grid plate 7, a shroud support 8, etc. The in-reactor structures 2 contain apparatus forming a core portion, and is a partition for introducing cooling water flowed in the core portion thereby to form a recirculation flow path for cooling water.

As the structures other than the in-reactor structures, a main steam nozzle 9, a feed water nozzle 10, a core spray nozzle 11, recirculation inlet nozzle 12, recirculation outlet nozzle 13, etc, are provided on the side wall (barrel portion) of the reactor pressure vessel 1. Piping of each system is connected to each of those nozzles.

A nuclear reactor pressure vessel lid or cover (hereunder referred to as a reactor pressure vessel head) 37 is provided on the top of the reactor pressure vessel 1. The reactor pressure vessel head 37 is fixed to the reactor pressure vessel 1 by stud bolts 37a mounted on a flange 37b. A reactor pressure vessel skirt 1b, a control rod drive housing 23 containing a control rod drive 20, an in-core monitor (ICM) housing containing an ICM 21, etc, are provided on the bottom of reactor pressure vessel 1. The control rod drive housing 23 and the ICM housing 24 are of structures other than the in-reactor structure.

A carrying out method of a reactor pressure vessel of the present embodiment will be explained hereunder, referring to FIG. 1. First, power off of a generator is effected and regular inspection of the nuclear power plant starts at step S1. A disengaging operation of the nuclear reactor is carried out at step S2. In the disengaging operation, a reactor pressure vessel head taking out operation for taking out the reactor pressure vessel head 37, a steam dryer taking out operation for taking out the steam drier 3, a shroud head taking out operation for taking out the shroud head 4, etc, are practiced. The disengaging operation of nuclear reactor is a critical operation necessary to handle fuels inside the core.

Figure 5:
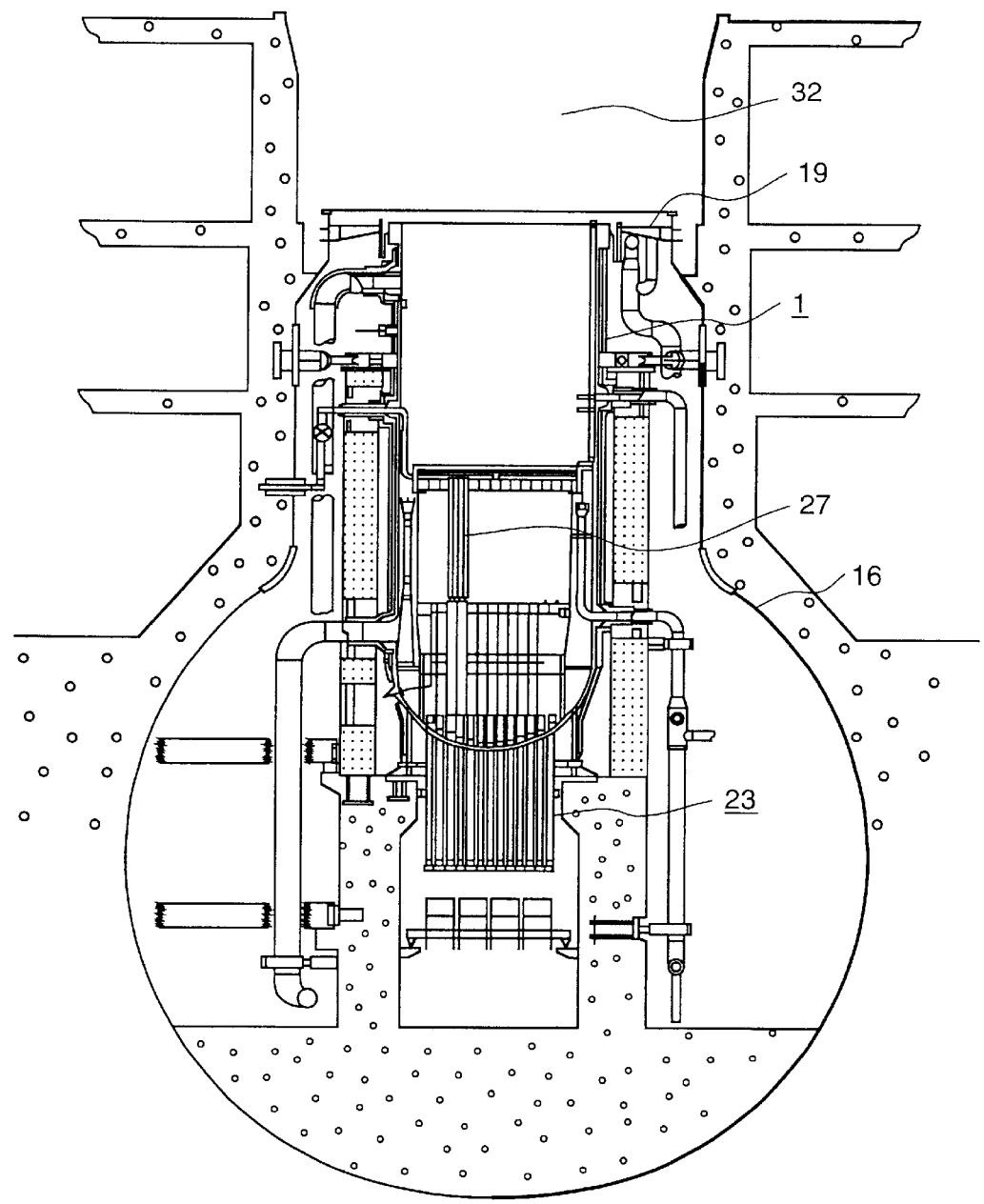
FIG. 5 is a rough vertical sectional view of an inside of the reactor pressure vessel during operation of taking off of fuels.

Next, an operation of taking out all the fuels in the core is practiced at step S3. In this operation, all the fuels loaded inside the core are moved to the fuel rack 33a inside the spent fuel pool 33. FIG. 5 shows a rough vertical sectional view of the inside of the reactor pressure vessel 1 during the fuel taking out operation. In FIG. 5, 27 denotes fuel (fuel assembly). All the fuels are taken out at this step, whereby a rate of surface dose of the reactor pressure vessel 1 can be reduced when the reactor pressure vessel 1 is carried out and an exposure dose to a worker can be reduced. After all the fuels have been taken out, reactor water inside the reactor pressure vessel 1 is extracted.

After the step S3, a disassembling operation of surroundings of the reactor pressure vessel at step S4 and a disassembling operation inside the reactor pressure vessel pedestal are practiced in parallel. The disassembling operation of surroundings of the reactor pressure vessel is practiced in the following procedure.

(1) Step S40: taking off the refueling bellows 15 and the bulk head plate 19.

(2) Step S41: taking off the primary containment vessel stabilizer 30.

(3) Step S42: cutting off and carrying out the nozzles 9–13 and the piping (such as 34) connected to each nozzle, and mounting a closing plate for sealingly closing on each nozzle.

(4) Step S43: taking off the reactor pressure vessel stabilizer 30a.

The disassembling operation inside the reactor pressure vessel pedestal is practiced in the following procedure:

(1) Step S50: taking off the control rod drive housing support block 25.

(2) Step S51: taking off cables of the control rod drive 20 and ICM 21.

(3) Step S52: taking off the control rod drive 20.

(4) Step S53: taking off cutting off piping 20a for inserting and extracting the control rod drive.

(5) Step S54: taking off the control rod drive housing support beam 22.

Figure 6:
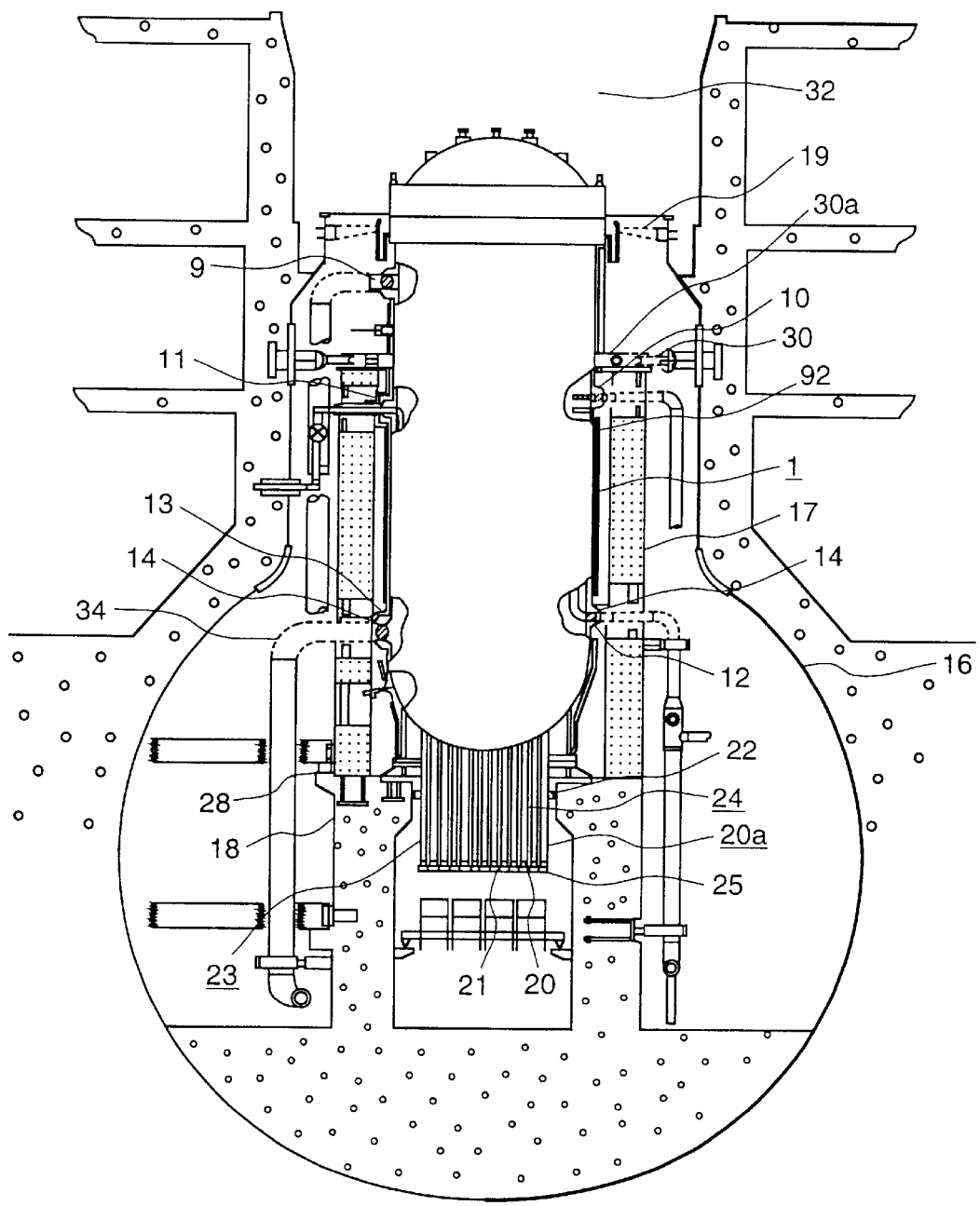
FIG. 6 is a vertical sectional view of the inside of the reactor pressure vessel, showing an objective position of disassembling operations of steps S4 and S5 in FIG. 1.

FIG. 6 shows the objective position of the disassembling operations at steps S4 and S5. In FIG. 6, a removal range by the disassembling operations is shown by a broken line. An operation period can be shortened by practicing the steps S4 and S5 in parallel.

Next, an opening portion for carrying out the reactor pressure vessel 1 is provided in the roof of the nuclear reactor building 31 at step S6. At this step, a shutter which is able to open and close and described later also is mounted on the upper side of the opening portion. Further, a large-sized crane (crane) is installed at an outside position close to the nuclear reactor building 31 at step S7. The steps S6 and S7 can be practiced in parallel if possible. Further, the steps S6 and S7 can be practiced in parallel with the steps S4 and S5, if possible. When the those operations are practiced in parallel, an operation period can be further shortened.

Figure 7:
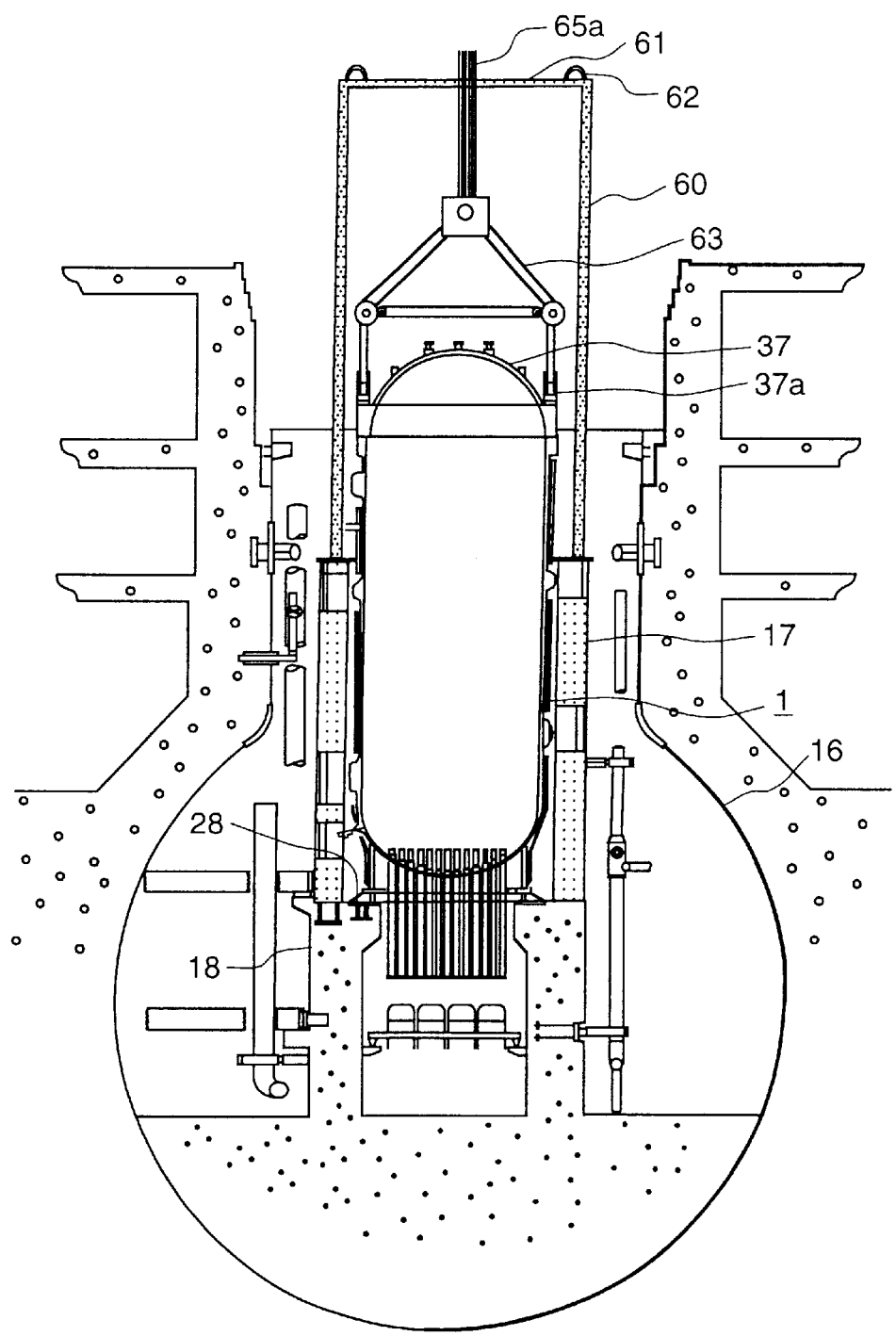
FIG. 7 is a vertical sectional view of the inside of the reactor pressure vessel, showing the condition at the time of a termination of a step S81 in FIG. 1.

Next, a mounting operation of a shield onto the reactor pressure vessel 1 is practiced at step S8. The mounting operation of the shield is practiced in such order as steps S80–S84. First, the steps S80 and S81 are explained, referring to FIG. 7. FIG. 7 is a view showing the condition at the time of termination of the step S81. At the step S80, the shield 60 carried in through the opening portion of the roof of the nuclear reactor building is temporarily placed on the reactor shield wall 17. The shield 60 is formed in a cylindrical shape, and a cylindrical shield upper lid or cover 61 is mounted thereon.

A strong-back (hanger) 63 which is a tool for hanging up the reactor pressure vessel 1 is mounted on the reactor pressure vessel head 37 by 8 to 10 stud bolts 36a. The hanger 63 is hung by the crane through a hanger 65a. The shield upper lid 61 has a slit-shaped opening portion through which hangers 63 and 65a can pass and it is provided, on the upper side thereof, with a hook 62 for hanging the shield 60.

Figure 8:
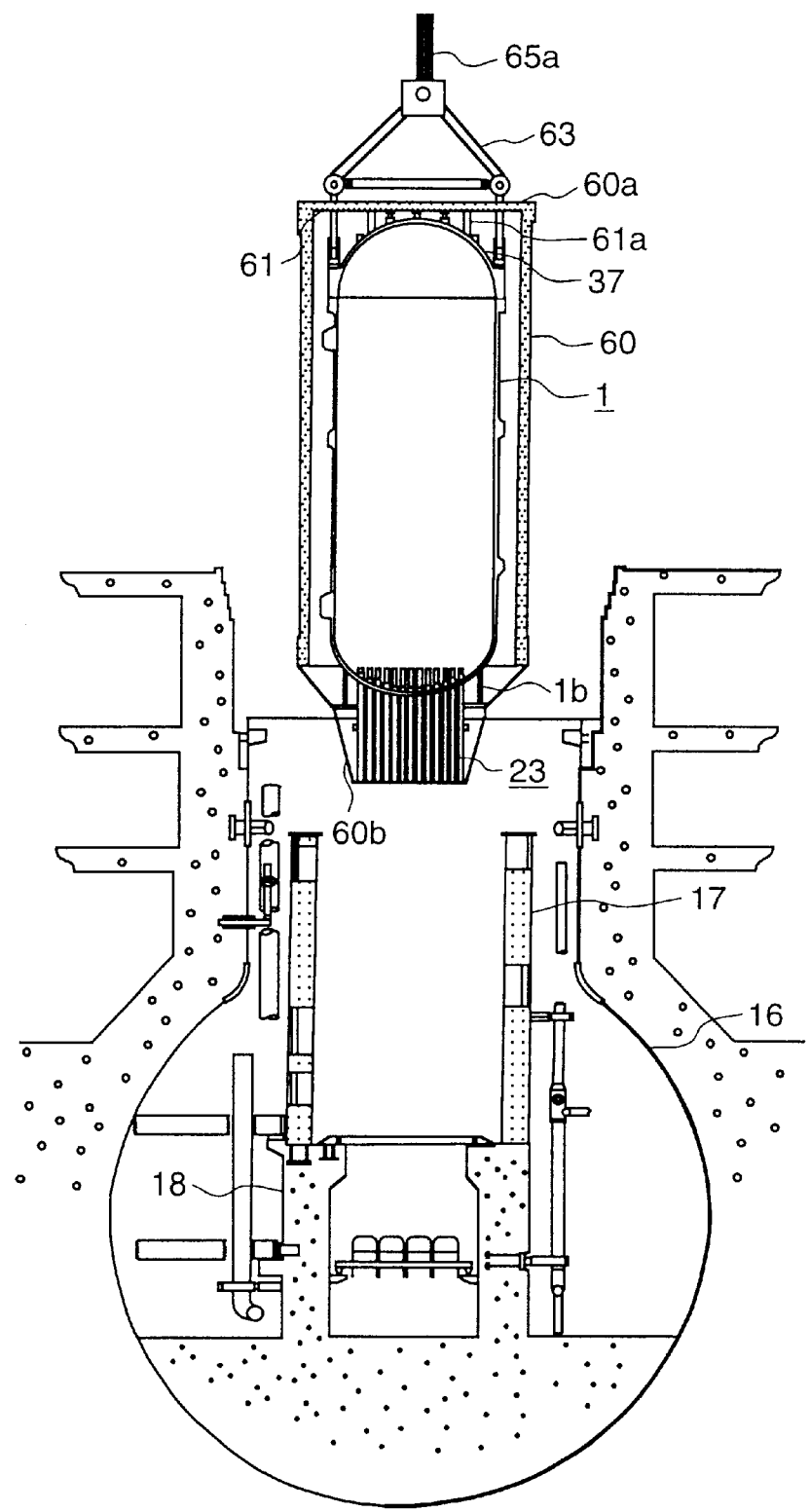
FIG. 8 is a vertical sectional view of the inside of the reactor pressure vessel, showing the condition when the reactor pressure vessel 1 is hung up further after a termination of a step S84 in FIG. 1.

Next, steps S82 to S84 are explained, referring to FIG. 8. FIG. 8 is a view showing the condition that after the S84 has been terminated, further the reactor pressure vessel 1 is hung up. At step S82, the reactor pressure vessel 1 is separated from the reactor pressure vessel pedestal 18 by disengaging the anchor bolts 28. At step S83, the reactor pressure vessel 1 is hung up by elevating the hanger 63 by the crane.

At step S84, the shield 60 is mounted on the reactor pressure vessel 1 by hanging up the reactor pressure vessel 1 and abutting the reactor pressure vessel head 37 to a stopper 61a mounted on the lower side (inner side) of the shield upper lid 61. Further, an opening portion of the shield upper lid 61 is covered with a protective sheet 60a, and end portions of the protective sheet 60a are sealed and fixed by seal tapes. As the protective sheets 60a and 60b, vinyle chloride sheets can be used.

In this manner, the shield 60 can be easily and in short time mounted on the periphery of the reactor pressure vessel 1 by hanging up the in-reactor incidental apparatus such as the in-reactor structures 2, control rod drive housing 23, etc, as a large-sized block in which the in-reactor incidental apparatus are integrated with the reactor pressure vessel 1. Further, by sealing the opening portion of the shield by the protective sheet, it is possible to prevent radioactive dusts adhered to the surface of the reactor pressure vessel 1 from dispersing, when the reactor pressure vessel 1 is carried out of the nuclear reactor building.

Next, under the condition that the shield 60 is mounted on the reactor pressure vessel 1, it is confirmed by contamination inspection that contamination of surfaces of the shield and protective sheets is removed and a surface dose rate has been lowered thereby to an extent that outer circumstances of the nuclear reactor building are not influenced. Further, in FIG. 7, the stopper 61a in FIG. 8 is omitted and in FIG. 8 the hook 62 in FIG. 7 is omitted.

As shown in FIG. 8, the shield 60 covers the whole of the reactor pressure vessell from the reactor pressure vessel head 37 to the upper end of the reactor pressure vessel skirt

1b. Since a region of the control rod drive housing 23 is lower in radiation dose than a circumstantial region of the core on the upper side thereof, it is unnecessary to mount the shield. Therefore, if the shield 60 covers the reactor pressure vessel 1 to the vicinity of the upper end of the reactor pressure vessel skirt 1b, the surface dose rate of the shield 60 can be reduced to a reference value (limit value) or less when the reactor pressure vessel 1 is carried out from the nuclear reactor building.

Next, the reactor pressure vessel is carried out at step S9. The carrying out operation of the reactor pressure vessel is practiced in order of steps S90 and S91. At the step S90, the reactor pressure vessel 1 is hung up as a large-sized block integrated with the shield 60, in-reactor structures 2, control rod drive housing 23, etc. At the step S91, the large-sized block hung up at the step 90 is carried out of the nuclear reactor building through the opening portion 31a of the nuclear reactor building 31.

Figure 9:
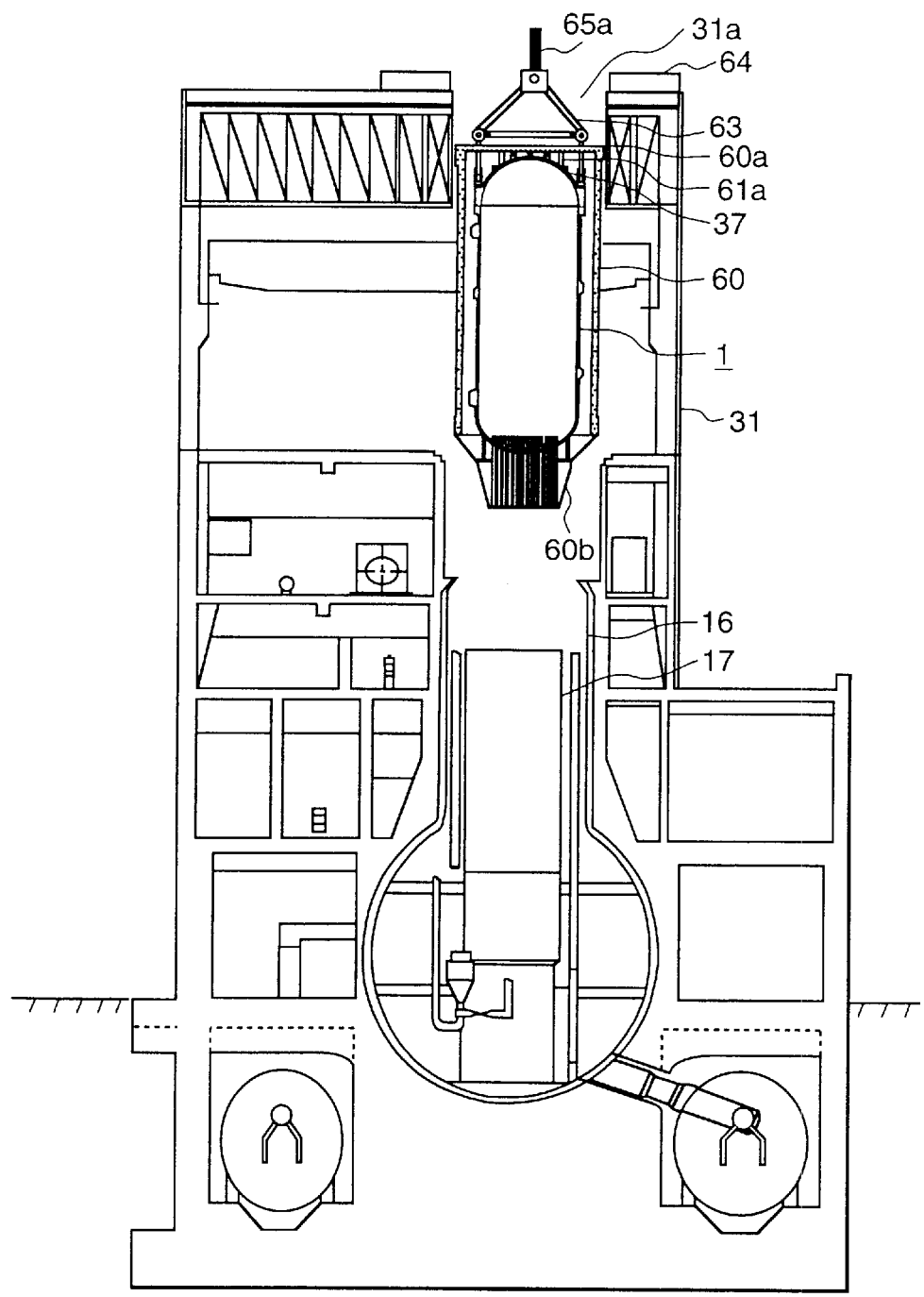
FIG. 9 is a view showing the condition that a large-sized block including the reactor pressure vessel is passing through an opening portion, at a step S91 in FIG. 1.
Figure 10:
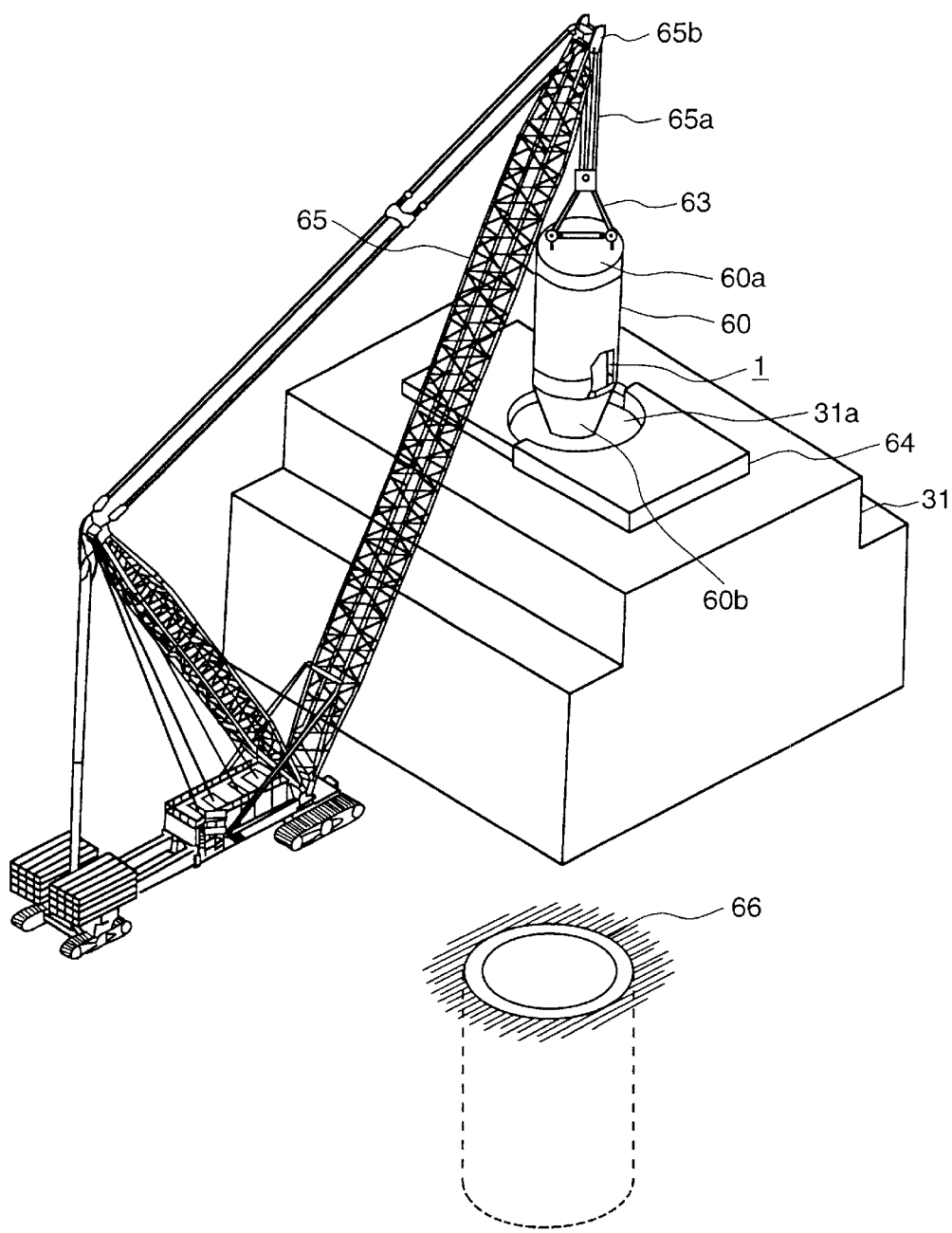
FIG. 10 is a view showing the condition that the large-sized block has been carried out of the reactor building through the opening portion of the reactor building, at a step S91 in FIG. 1.

FIG. 9 is a view showing the condition that the large-sized block including the reactor pressure vessel 1 is passing through the opening portion 31a. In FIG. 9, 64 denotes a shutter which is mounted on the upper side of the opening portion 31a and able to open and close. FIG. 10 is a view showing the condition that the large-sized block has been carried out of the nuclear reactor building through the opening portion 31a of the building. After the large-sized block has been carried out of the nuclear reactor building in this manner, the shutter is closed. In FIG. 10, 65 denotes the crane and 66 denotes a storage for the large-sized block including the reactor pressure vessel 1, provided in the vicinity of the nuclear reactor building.

Next, the large-sized block carried out from the nuclear reactor building 31 is carried into the storage 66 at step S10. At this step, the top portion 65b of the crane 65 is moved from a portion over the opening portion 31a to another portion over the storage 66 under the condition that the large-sized block including the reactor pressure vessel 1 is hung by the crane 65, and then the large-sized block is lowered and carried into the storage 66. FIG. 11 is a view showing the condition immediately before the large-sized block is carried into the storage 66.

By the above-mentioned procedures, the carrying out operations as a large block in which the reactor pressure vessel 1 is integrated with the shield 60 and the in-and out-reactor incidental apparatus (core internals 2, control rod drive housing 23, etc.) are completed.

According to the present embodiment, under the condition that the in- and out-reactor incidental apparatus (core internals 2, control rod drive housing 23, etc.) are mounted, it is possible to easily mount the shield 60 on the circumstance of the reactor pressure vessel 1 in a short time by only hanging up the reactor pressure vessel 1. Therefore, the time required for carrying out the reactor pressure vessel 1 and the in- and out-reactor incidental apparatus integrated therewith can be shortened while reducing the surface dose rate of the shield 60 covering the reactor pressure vessel 1 to a reference value or less. Thereby, it is possible to shorten an exchanging operation period of the reactor pressure vessel 1 and shorten a shutdown period of the nuclear power plant.

Further, since a worker approaches to the reactor pressure vessel 1 less times when the shield 60 is mounted, a radiation dose exposed to the worker can be reduced at the time of mounting the shield. Further, the shield 60 is sufficient if it covers the reactor pressure vessel 1 from the reactor pressure vessel head 37 to the upper end of the reactor pressure vessel skirt 1b. Therefore, the shield 60 is not unnecessarily enlarged (in weight), compared with the case where the reactor pressure vessel 1 and in- and out-reactor incidental apparatus are fully covered. That is, the shield 60 is sufficient to have a necessary and minimum size for shielding radiations from the reactor pressure vessel 1.

Further, in the present embodiment, it is sufficient even if reactor water in the reactor pressure vessel 1 is not extracted after a termination of the step S3. In this case, the reactor water has an effect to shield radiations from the core internals of the reactor pressure vessel 1 when the large-sized block including the reactor pressure vessel 1 is carried out of the nuclear reactor building 31. Therefore, the surface dose rate of the reactor pressure vessel 1 is more reduced. However, it is necessary to mount plugs on respective nozzles for preventing the reactor water from leaking to the piping side, before cutting off the nozzles. Further, after cutting off the nozzles, it is necessary to mount a shutdown or closing plate for sealing on each nozzle in order to prevent the reactor water from leaking.

Next, another embodiment of a shield to be mounted on the reactor pressure vessel 1 at step S8 will be explained. The present shield is one that in the shield shown in FIG. 7 stopper beams abutting the flange 37b of the reactor pressure vessel head 37 are provided instead of the shield upper lid 61. The structure of the shield 60 is the same as in FIG. 7, so that explanation thereof is omitted here.

FIG. 12a is a side view cut off in part, showing the details of a mounting portion of the shield, and FIG. 12b is a rough upper plan view of FIG. 12a. As shown in FIG. 12b, both ends of each of the 4 stopper beams 67 are fixed to the upper surface of the shield 60 by fixing bolts 67b. The stopper beams 67 are arranged approximately equidistantly in the peripheral direction at positions that they are not interfaced with the hanger 63. A hook 67a for hanging up the shield 60 is provided at a central portion of the respective stopper beams 67.

In the case of the present shield, a central portion of each of the stopper beams 67 abuts the flange 37b, whereby the shield 60 can be mounted by only hanging up the reactor pressure vessel 1. Although omitted in FIGS. 12a and 12b, in the present shield, also, the reactor pressure vessel head 37, etc, projecting to the upper side of the shield 60 is covered with a protective sheet, and the ends of the protective sheet are sealed and fixed by seal tape. Thereby, when the reactor pressure vessel 1 is carried out of the nuclear reactor building, radioactive dusts adhered to the surface of the reactor pressure vessel 1 can be prevented from dispersing.

In the case where the present shield is used, the same effect as the case where the shield in FIG. 7 is used is also attained. That is, the shield 60 can be easily mounted on the reactor pressure vessel 1 in a short time. Thereby, a time required for carrying out the reactor pressure vessel 1 and in- and out-reactor incidental apparatus integrated therewith while reducing a surface dose rate of the shield 60a covering the reactor pressure vessel 1 to a reference value or less. Further, a radiation exposure dose to the worker when the shield 60 is mounted can be reduced.

Further, in the present shield, the shield 60 covers the reactor pressure vessel 1 from the flange 37b to the top of the reactor pressure vessel skirt 1b. Since the region of the reactor pressure vessel head 37 is less in radiation dose than the circumferential region of the core at the lower side of the reactor pressure vessel head, it is not necessary to mount a shield. In this case, the shield 60 can be further small-sized (made light in weight) than the shield in FIG. 7.

Further, the above each embodiment is explained taking an example in which the shield 60 is constructed in onelayer, however, the shield can be made in multi-layers. That is, the shield 60 can be made of cylindrical structures and in multi-layers. In the case where thickness of a plate material (iron plate, etc,) which can be used for manufacturing the large-sized cylindrical structure such as the shield 60 can not be made thick to the extent that radiations from the reactor pressure vessel 1 can be shielded, a sufficient radiation shielding function can be maintained by using a multi-layer structure.

Further, in the above embodiment, an example in which the present invention is applied for carrying out the reactor pressure vessel in the reactor pressure vessel exchanging work is explained, however, the present invention can be applied to carrying out works of radioactivated large-sized apparatus (including the reactor pressure vessel) in waste reactor works, etc.

What is claimed is:

1. A reactor pressure vessel carrying out method of carrying out of a radioactivated reactor pressure vessel from a reactor building of a nuclear power plant, comprising:

providing a first opening portion for carrying out said reactor pressure vessel in a region, positioned at an upper portion of said reactor pressure vessel, of a roof of said reactor building;

carrying a radiation shield for covering said reactor pressure vessel and shielding radiations into said reactor building through said first opening portion, and installing said radiation shield on an upper side of said reactor pressure vessel;

lowering a hanger for hanging up said reactor pressure vessel through said first opening portion and a second opening portion provided on an upper end portion of said radiation shield;

abutting a part of the upper end portion of said reactor pressure vessel and a part of the upper portion of said radiation shield by raising said reactor pressure vessel by said hanger; and hanging up and carrying said reactor pressure vessel and said radiation shield abutting said reactor pressure vessel out of said reactor building.

2. A reactor pressure vessel carrying out method according to claim 1, wherein said step of hanging up and carrying said reactor pressure vessel and said radiation shield is performed under the condition that incidental apparatus are mounted on said reactor pressure vessel.

3. A reactor pressure vessel carrying out method according to claim 1, wherein said step of hanging up and carrying said reactor pressure vessel and said radiation shield is performed under the condition that said reactor pressure vessel is covered with said radiation shield as far as the vicinity of an upper end portion of a reactor pressure vessel skirt provided on a bottom portion of said reactor pressure vessel.

4. A reactor pressure vessel according to claim 1, wherein said step of hanging up and carrying said reactor pressure vessel and said radiation shield is performed under the condition that reactor water is contained in said reactor pressure vessel.

5. A reactor pressure vessel carrying out method according to claim 1, wherein said radiation shield is provided with a stopper at the upper end portion thereof and said abutting step is to abut a part of a lid of said reactor pressure vessel and said stopper.

6. A reactor pressure vessel carrying out method according to claim 1, wherein said radiation shield is constructed so that a plurality of cylindrical shields covering said reactor pressure vessel are made in multi-layers.

* * * * *